(12) United States Patent
Takehana et al.

(10) Patent No.: US 6,373,610 B1
(45) Date of Patent: Apr. 16, 2002

(54) OPTICAL SURGE SUPPRESSING APPARATUS

(75) Inventors: Tsukasa Takehana; Nobutaka Watanabe, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/229,611

(22) Filed: Jan. 13, 1999

(30) Foreign Application Priority Data

Jan. 14, 1998 (JP) .......................................... 10-020334

(51) Int. Cl.[7] .......................... H04B 10/00; H04B 10/02
(52) U.S. Cl. ........................................ 359/161; 359/177
(58) Field of Search ................................ 359/110, 161, 359/173, 177, 179

(56) References Cited

U.S. PATENT DOCUMENTS

| | | | |
|---|---|---|---|
| 5,680,246 A | * 10/1997 | Takahashi et al. | 359/341 |
| 5,701,195 A | * 12/1997 | Chikama | 359/341 |
| 5,864,422 A | * 1/1999 | Miyazaki et al. | 359/341 |
| 5,923,463 A | * 7/1999 | Hamada | 359/341 |

FOREIGN PATENT DOCUMENTS

| | | |
|---|---|---|
| JP | 6-45682 | 2/1994 |
| JP | 7-240717 | 9/1995 |
| JP | 8-18136 | 1/1996 |
| JP | 8-018136 | 1/1996 |
| JP | 8-256118 | 10/1996 |
| JP | 8-331048 | 12/1996 |
| JP | 9-130328 | 5/1997 |
| JP | 9-321373 | 12/1997 |

OTHER PUBLICATIONS

"A consideration of optical surge in optical amplifier systems", Proceeding of the IEICE Spring Conference, B–941, Mar. 1993.
Japanese Office Action dated Aug. 11, 2000, with partial translation.
Japanese Office Action dated May 12, 2000, with partial translation.

* cited by examiner

Primary Examiner—Leslie Pascal
Assistant Examiner—Dalzid Singh
(74) Attorney, Agent, or Firm—McGinn & Gibb, PLLC (57) ABSTRACT

An optical surge suppressing apparatus includes an output light level compensating circuit, an optical surge compressing circuit, and an optical amplifier. The output light level compensating circuit compensates for a level drop generated in input signal light. The optical surge compressing circuit suppresses an optical surge generated in the input signal light. The optical amplifier outputs the input signal light in which the level drop is compensated for by the output light level compensating circuit and the optical surge is suppressed by the optical surge compressing circuit.

15 Claims, 5 Drawing Sheets

OPTICAL SURGE SUPPRESSING APPARATUS

BACKGROUND OF THE INVENTION

The present invention relates to an optical surge suppressing apparatus for suppressing an optical surge generated upon steep level variations in optical input signal.

In recent years, introduction of a long-distance transmission system using optical amplifiers instead of some regenerative repeaters is examined along with the development of optical amplifiers such as an erbium-doped optical fiber amplifier (EDFA).

Since an optical amplifier actually used in the transmission system must have stable amplification characteristics, it is undergone gain control such as (I) constant optical output control and (II) constant gain control. It is generally known in the constant optical output control and constant gain control that an optical surge is often generated upon an optical input hit or steep level variations resulting from disconnection of a transmission path, an apparatus fault, erroneous insertion/removal of a connector, or the like.

Figure 5A:
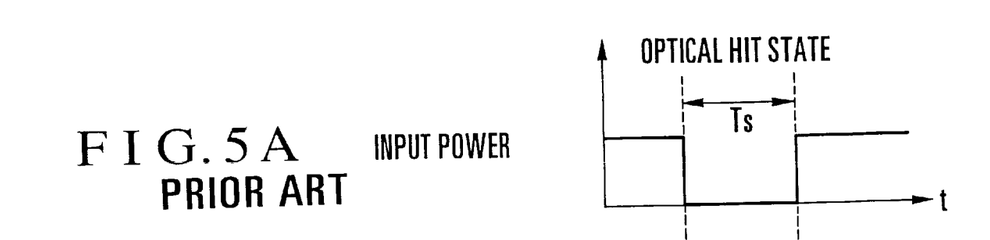
FIGS. 5A to 5C are graphs showing the operational characteristics of a conventional optical amplifier using constant optical output control.
Figure 5B:
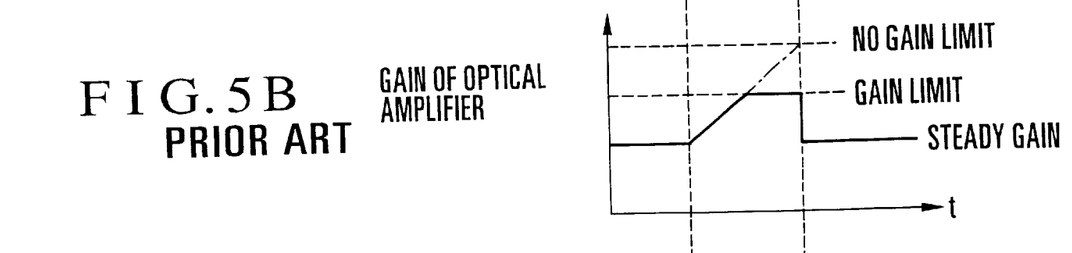
Figure 5C:
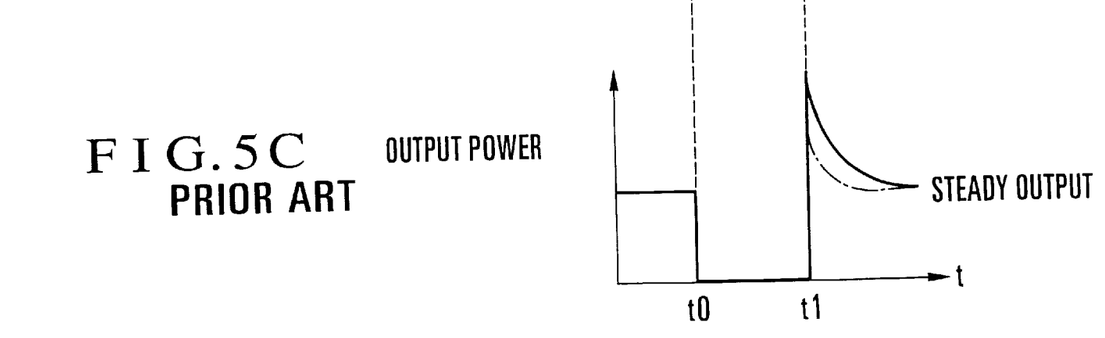

FIGS. 5A to 5C show an example of operation characteristics in an optical amplifier using constant optical output control.

When an input hit for a time Ts (sec) shown in FIG. 5A occurs, the optical amplifier must increase the gain in order to keep an output constant regardless of the absence of any input signal, as shown in FIG. 5B. However, when an input signal returns to the original level at time t1 after the hit time, an optical surge is generated as shown in FIG. 5C. The optical surge poses many problems including burnout of the end face of an optical connector and destruction of a light-receiving unit.

As a method of suppressing such an optical surge, Japanese Patent Laid-Open Nos. 7-240717 and 8-18136 disclose the following techniques.

Japanese Patent Laid-Open No. 7-240717 discloses a method of suppressing an optical surge by switching between two control methods. That is, an input level is detected and compared with a predetermined reference value.

(I) If the input level is higher than the reference value, an optical output is controlled constant.
(II) If the input level is lower than the reference value, control is switched to constant gain control (limiter operation or stop of the amplifier).

Japanese Patent Laid-Open No. 8-18136 discloses a method of suppressing an optical surge by monitoring the output light level and gain of an optical fiber amplifier and comparing them with corresponding setting errors to select constant optical output control operation or optical gain limiter operation. An optical surge waveform indicated by the chain line in FIG. 5C is an optical surge when the optical gain limiter operation is selected.

The conventional optical surge suppressing circuit is constituted as described above. In the former optical surge suppressing method, since gain limiter operation and constant optical output operation are switched based on an input light level, operation at the switching point may become unstable. If a hysteresis is set at the switching point or a large time constant is set to stabilize operation, an optical surge cannot be satisfactorily suppressed for a short signal hit time.

In the latter optical surge suppressing method, although an increase in gain under constant optical output control can be suppressed to a set gain by gain limiter operation upon an input hit, an optical surge determined by the set gain of the limiter is generated.

"A consideration of optical surge in optical amplifier systems", PROCEEDINGS OF THE IEICE SPRING CONFERENCE, B-941, March 1993, reports that an optical surge generated with a short rise time (msec or less) grows through optical amplifier systems. Even when the gain is suppressed to a set value by gain limiter operation, and the amount of generated optical surge is small, the optical surge grows through optical amplifier systems and thus cannot be ignored.

SUMMARY OF THE INVENTION

It is an object of the present invention to provide an optical surge suppressing apparatus for compensating for a level drop of signal light.

It is another object of the present invention to provide an optical surge suppressing apparatus for reliably suppressing generation of an optical surge and improving the reliability of an optical transmission system.

To achieve the above objects, according to the present invention, there is provided an optical surge suppressing apparatus comprising level drop compensating means for compensating for a level drop generated in input signal light, optical surge compressing means for suppressing an optical surge generated in the input signal light, and signal light output means for outputting the input signal light in which the level drop is compensated for by the level drop compensating means and the optical surge is suppressed by the optical surge compressing means.

DESCRIPTION OF THE PREFERRED EMBODIMENT

The present invention will be described in detail below with reference to the accompanying drawings.

Figure 1:
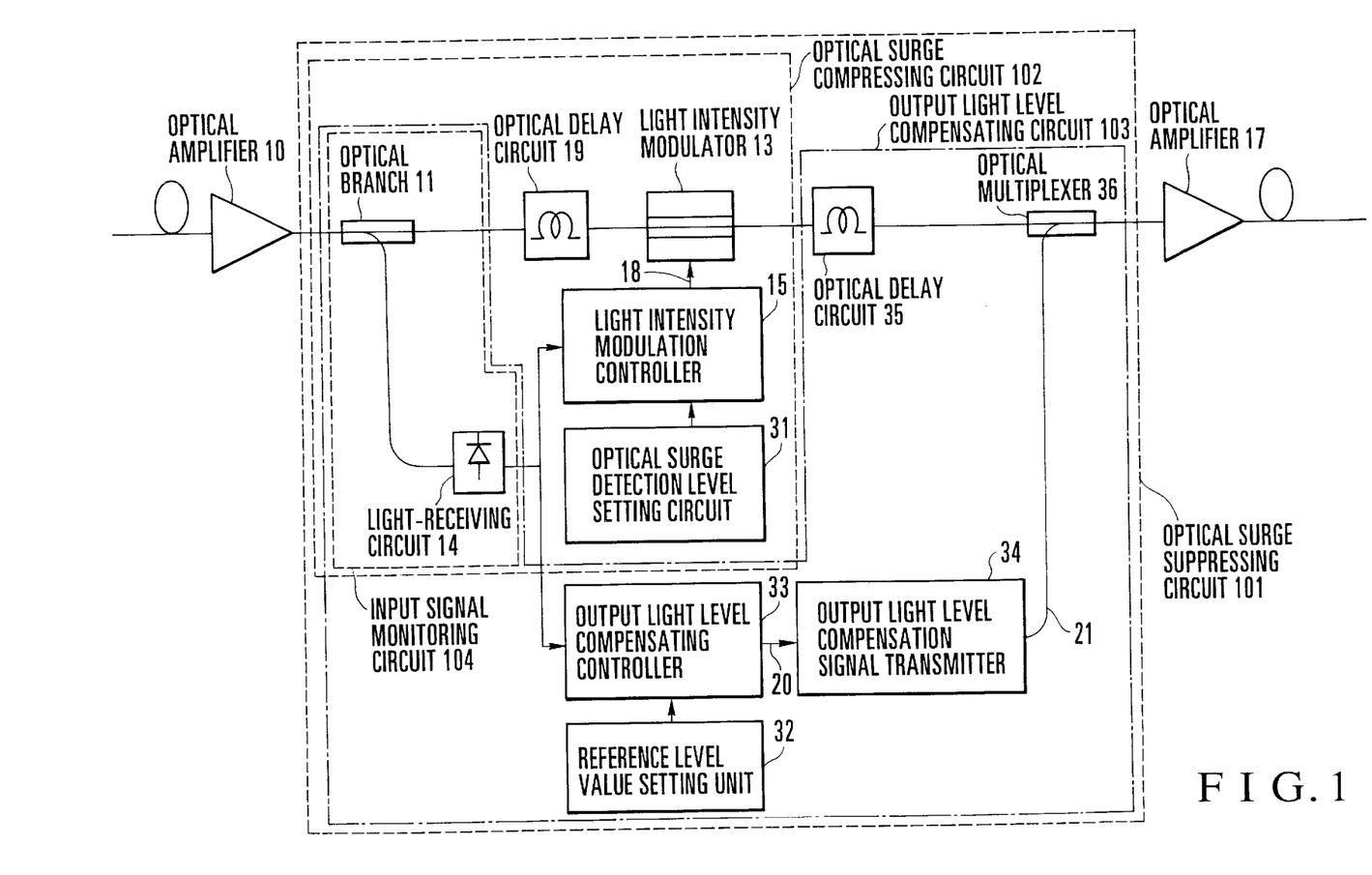
FIG. 1 a block diagram showing an optical surge suppressing circuit according to an embodiment of the present invention.

FIG. 1 shows an optical surge suppressing circuit according to an embodiment of the present invention. In FIG. 1, an optical surge suppressing circuit 101 comprises an optical surge compressing circuit 102 for compressing an optical surge included in input signal light output from an input-side optical amplifier 10, and an output light level compensating circuit (level drop compensating means) 103 for, when a steep level drop such as a hit occurs in input signal light, superposing a pseudo signal on the input signal light only during the low-level period of the input signal light, thereby compensating for the level drop of the input signal light in appearance, and outputting the resultant light to an optical amplifier (signal light output means) 17.

The optical surge suppressing circuit 101 having this arrangement prevents generation of an optical surge and compensates for a steep level drop of input signal light.

The optical surge compressing circuit 102 is constituted by an optical branch 11 for branching an output from the optical amplifier 10 into signal light and monitoring light, a light intensity modulator 13 for modulating the intensity of the signal light from the optical branch 11, a light-receiving circuit 14 for receiving the monitoring light from the optical branch 11, a light intensity modulation controller (optical surge detecting means) 15 for controlling the light intensity modulator 13 on the basis of an output from the light-receiving circuit 14, an optical delay circuit 19 for delaying the signal light from the optical branch 11 and outputting it to the light intensity modulator 13, and an optical surge detection level setting circuit 31 for outputting an optical surge detection level set in the light intensity modulation controller 15. The optical branch 11 and light-receiving circuit 14 constitute an input signal monitoring circuit 104.

The output light level compensating circuit 103 is constituted by a reference level value setting unit 32 in which an input level drop reference value is set, an output light level compensating controller (signal light level drop detecting means) 33 for outputting an input light level drop signal 20 on the basis of the input level drop reference value set in the reference level value setting unit 32, an output light level compensation signal transmitter 34 for transmitting an output light level compensation signal 21 on the basis of the input light level drop signal 20 from the output light level compensating controller 33, an optical delay circuit 35 for delaying an output from the light intensity modulator 13, and an optical multiplexer (compensation signal light superposing means) 36 for multiplexing output light from the optical delay circuit 35 and the output light level compensation signal 21 from the output light level compensation signal transmitter 34.

Figure 2:
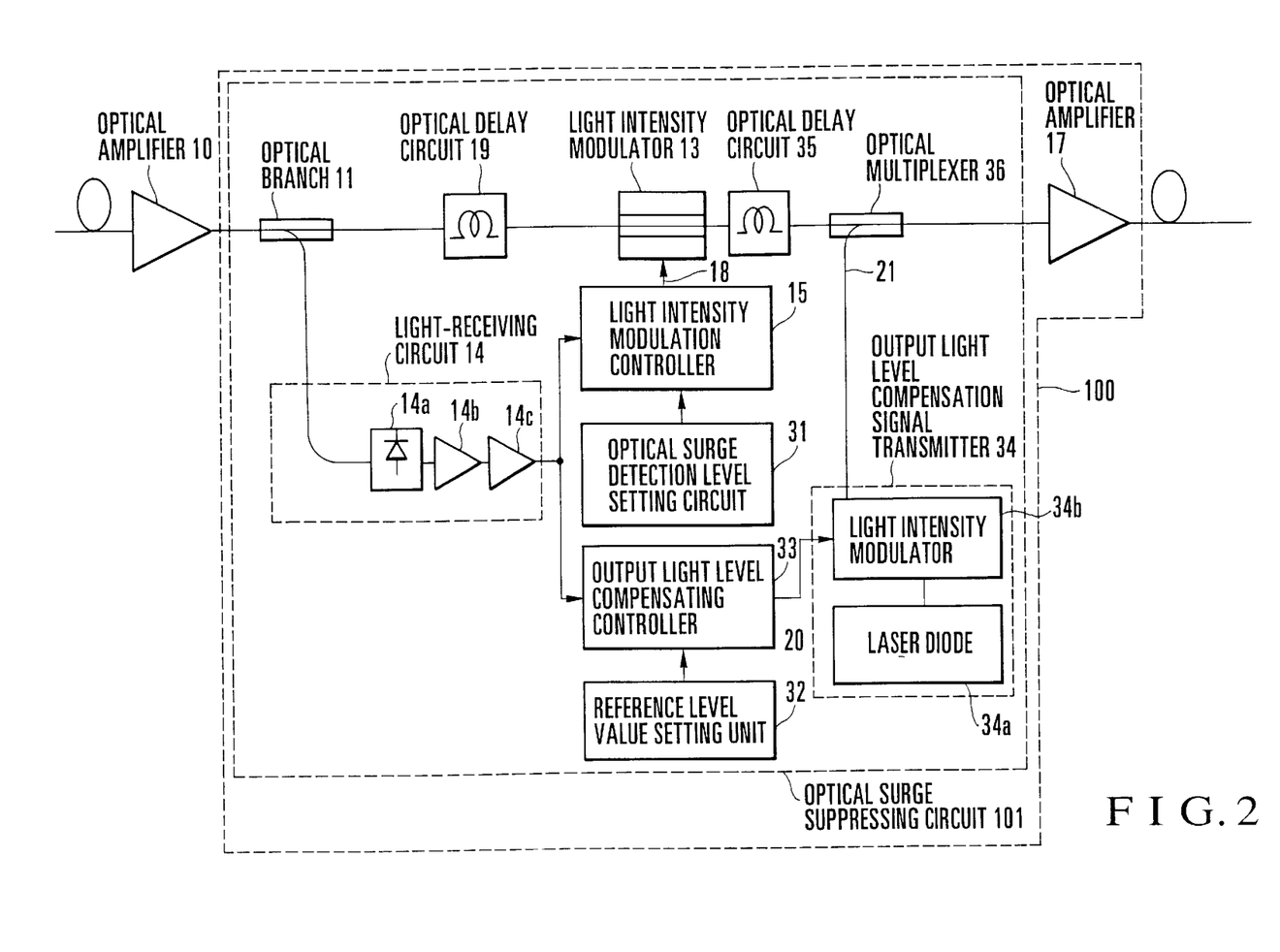
FIG. 2 is a block diagram of the arrangement of the optical surge suppressing circuit including the internal arrangements of a light-receiving circuit and output light level compensation signal transmitter shown in FIG. 1.

FIG. 2 shows the arrangement of the optical surge suppressing circuit 101 including the internal arrangements of the light-receiving circuit 14 and output light level compensation signal transmitter 34 in FIG. 1.

The light-receiving circuit 14 is made up of a PIN photodiode 14a for photoelectrically converting monitoring light from the optical branch 11, a current-to-voltage conversion circuit 14b for converting an output current from the PIN photodiode 14a to a voltage signal, and a broadband amplifier 14c for amplifying an output signal from the current-to-voltage conversion circuit 14b.

The output light level compensation signal transmitter 34 is formed from a laser diode (compensation signal light generating means) 34a having an oscillation wavelength different from that of input signal light, and a light intensity modulator 34b for modulating the light intensity of a light signal output from the laser diode 34a in accordance with the input light level drop signal 20 from the output light level compensating controller 33 and outputting the output light level compensation signal 21 to the optical multiplexer 36.

As the optical amplifier 10, an erbium-doped fiber amplifier (EDFA) constituting a constant optical output circuit is employed. The input signal monitoring circuit 104 made up of the optical branch 11 and light-receiving circuit 14 monitors input signal light using monitoring light branched from the input signal light by the optical branch 11.

The light intensity modulator 13 changes the loss in accordance with a high-speed control signal 18 from the light intensity modulation controller 15, and compresses an optical surge to a predetermined level. As the light intensity modulator 13, e.g., a field absorption semiconductor optical modulator is used. The PIN photodiode 14a has a band of 600 MHz.

The broadband amplifier 14c outputs the voltage signal output from the current-to-voltage conversion circuit 14b as a monitoring signal to the light intensity modulation controller 15 and output light level compensating controller 33. The light intensity modulation controller 15 monitors the presence/absence of an optical surge of input signal light using the monitoring signal output from the light-receiving circuit 14. When the light intensity modulation controller 15 detects an optical surge, it outputs the high-speed control signal 18 to change the transmission loss of the light intensity modulator 13 and compress the optical surge to a predetermined level.

The optical delay circuit 19 is arranged on the input side of the light intensity modulator 13 to delay input signal light so as to compress an optical surge without any time shift in the light intensity modulator 13.

In the optical surge detection level setting circuit 31, an optical surge detection level setting value to be compared with the input signal monitoring level of monitoring light is set. The light intensity modulation controller 15 compares the monitoring signal level with the optical surge detection level setting value from the optical surge detection level setting circuit 31 using the monitoring light level, thereby detecting the presence/absence of an optical surge.

Figure 4A:
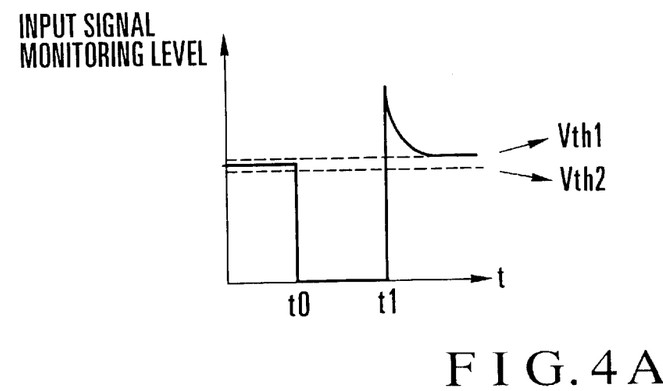
FIG. 4A is a graph showing the input signal monitoring level vs. the optical surge detection level setting value and input level drop reference value in the optical surge suppressing circuit shown in FIG. 1, and FIGS. 4B and 4C are graphs showing the transmission characteristics of a light intensity modulator and changes in output light level compensation signal light, respectively.
Figure 4B:
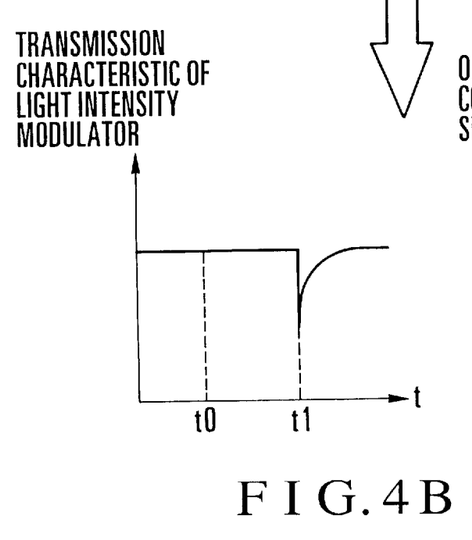
Figure 4C:
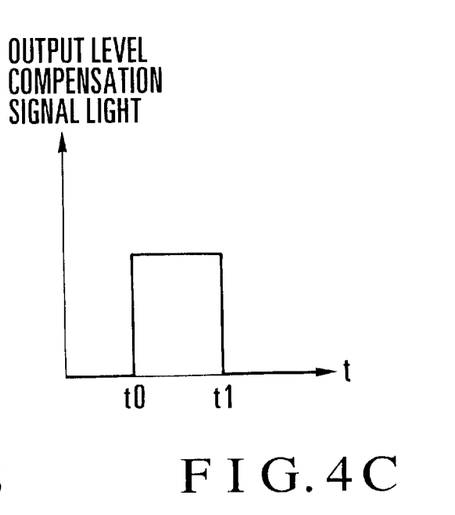

FIG. 4A shows the input signal monitoring level vs. optical surge detection level setting value Vth1 and input level drop reference value Vth2 (to be described later). FIGS. 4B and 4C show the transmission characteristics of the light intensity modulator and changes in output light level compensation signal light, respectively.

The input level drop reference value Vth2 (FIG. 4A) to be compared with a monitored signal light level to detect a level drop of input light is set in the reference level value setting unit 32. The output light level compensating controller 33 compares the monitored signal light level with the input level drop reference value Vth2 to detect a level drop of input light.

The laser diode 34a oscillates a laser beam with an oscillation wavelength different from that of input signal light. The light intensity modulator 34b controls the loss in accordance with the input light level drop signal 20 from the output light level compensating controller 33, and outputs to the optical multiplexer 36 the output light level compensation signal light 21 generated based on an oscillation output from the laser diode 34a, thus compensating for a level drop of signal light.

The optical delay circuit 35 gives a delay amount to input signal light so as to superpose the output light level compensation signal light 21 output from the light intensity modulator 34b on an optimum timing position at which the level of input signal light output from the light intensity modulator 13 drops. The optical multiplexer 36 superposes the output light level compensation signal light 21 output from the light intensity modulator 34b on a timing position at which the level of input signal light given the delay amount drops. The optical amplifier 17 has the same arrangement as that of the optical amplifier 10 for amplifying an optical output from the optical multiplexer 36.

Operation of the optical surge suppressing circuit 101 having this arrangement will be explained.

Figures 3A, 3B:
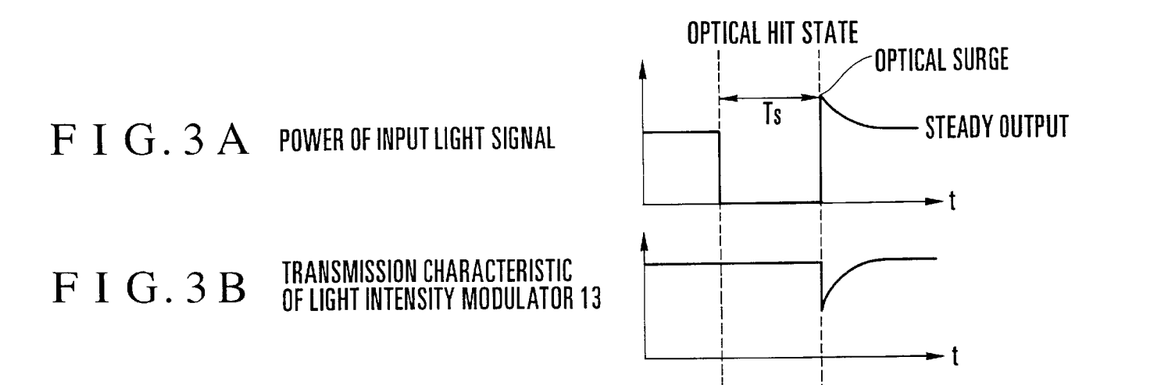
FIGS. 3A to 3E are timing charts of the main part of the optical surge suppressing circuit shown in FIG. 2.

Assume that an optical hit having a hit time width Ts with rise and fall times on several $\mu$s order occurs in input signal light to the optical amplifier 10 to generate an optical surge in output light from the optical amplifier 10, as shown in FIG. 3A.

Input signal light to the optical surge suppressing circuit 101 is branched into signal light and monitoring light by the optical branch 11, and the input light level is measured by the light-receiving circuit 14. The monitoring light is converted into a current signal by the PIN photodiode 14a of the light-receiving circuit 14, and the current signal is converted into a voltage signal by the current-to-voltage conversion circuit 14b. The voltage signal output from the current-to-voltage conversion circuit 14b is amplified by the broadband amplifier 14c and output to the light intensity modulation controller 15 and output light level compensating controller 33.

The light intensity modulation controller 15 compares the signal light level monitored by the light-receiving circuit 14 with an optical surge detection level setting value (steady input level) set in the optical surge detection level setting circuit 31. When the monitored signal light level is equal to or higher than the optical surge detection level setting value Vth1, the light intensity modulation controller 15 determines an optical surge and outputs the high-speed control signal 18 to control the loss of the light intensity modulator 13.

Figure 3C:
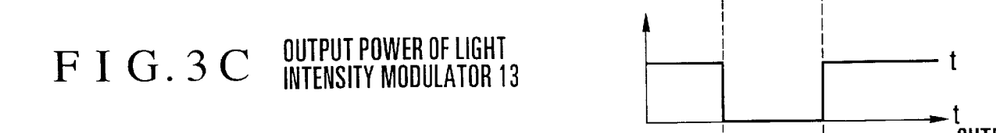

The light intensity modulator 13 controls the loss by controlling an application voltage. The loss is increased as shown in FIG. 3B at a given timing position of the signal light shown in FIG. 3A on which the optical surge is superposed, thereby obtaining an output (FIG. 3C) in which the optical surge is compressed.

The output light level compensating controller 33 compares the signal light level monitored by the light-receiving circuit 14 with the input level drop reference value Vth2 set in the reference level value setting unit 32 to detect a level drop of input light. Then, while the monitored signal light level is equal to or lower than the input level drop reference value Vth2, the output light level compensating controller 33 transmits the input light level drop signal 20 converted into a desired level to the light intensity modulator 34b of the output light level compensation signal transmitter 34.

In the output light level compensation signal transmitter 34, the loss of the light intensity modulator 34b is controlled by the input light level drop signal 20 transmitted from the output light level compensating controller 33, and the output light level compensation signal light 21 generated based on an oscillation output from the laser diode 34a so as to compensate for a level drop of signal light is output to the optical multiplexer 36. The optical multiplexer 36 superposes the output light level compensation signal light 21 from the output light level compensation signal transmitter 34 on a timing position at which the level of input signal light given a delay amount by the optical delay circuit 35 drops.

Figure 3D:
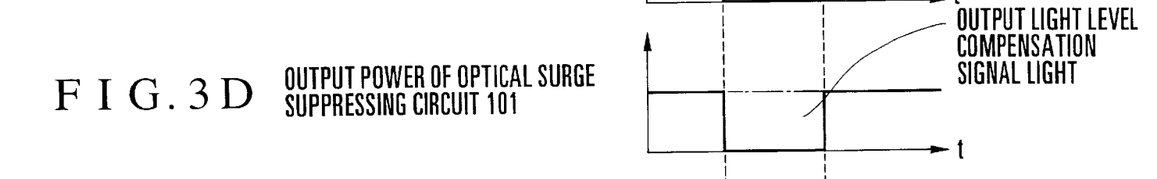
Figure 3E:
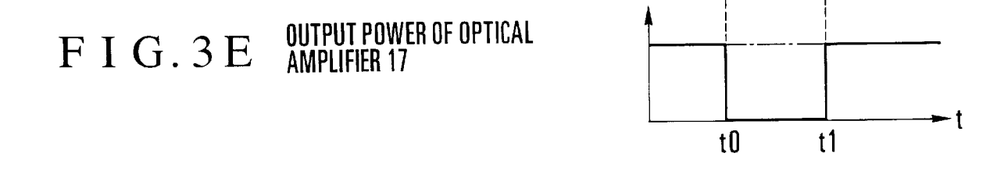

As a result, signal light output from the optical surge suppressing circuit 101 changes to signal light without any hit in appearance, as shown in FIG. 3D. Therefore, an optical surge is suppressed and is not generated in an output from the output-side optical amplifier 17, as shown in FIG. 3E. Note that the optical surge suppressing signal can be removed to prevent a code error at a light-receiving terminal by using an optical filter for cutting the wavelength of optical-surge-suppressed signal light at the light-receiving terminal.

The delay amount is adjusted in the optical delay circuit 19 so as to optimize compression of an optical surge by the light intensity modulator 13, and in the optical delay circuit 35 so as to optimally superpose the output light level compensation signal light on a timing position at which the level of signal light drops.

According to the above embodiment, even if the level of input signal light drops due to a hit or the like to generate an optical surge, the optical surge can be reliably suppressed by the optical surge compressing circuit 102. A level drop of signal light arising from a hit or the like can be compensated for by the output light level compensating circuit 103 to output signal light free from any level drop of signal light and any optical surge in appearance.

In this embodiment, a field absorption semiconductor optical modulator is used as the light intensity modulator 13. The same effects can also be obtained by a light intensity modulator capable of high-speed operation such as a lithium niobate (LN) modulator.

In this embodiment, the optical amplifiers 10 and 17 perform constant optical output control. The same effects can also be obtained by an optical amplifier subjected to constant gain control or an optical amplifier which can operate under both constant optical output control and constant gain control.

In linear relay using an optical amplifier circuit block 100 shown in FIG. 2 which is constituted by the surge suppressing circuit 101 and the optical amplifier 17 for amplifying an output from the surge suppressing circuit 101, the wavelength of the laser diode 34a of the output light level compensation signal transmitter 34 used in the optical amplifier circuit block 100 can be changed little by little to specify an optical hit period from the wavelength of the laser diode 34a at the light-receiving terminal.

According to the present invention, even if the level of input signal light drops owing to a hit or the like to generate an optical surge, signal light free from any level drop and any optical surge in appearance can be regenerated to improve the reliability of the optical transmission system using an optical amplifier.

What is claimed is:

1. An optical surge suppressing apparatus comprising:
    a level drop compensating device configured to compensate for a level drop generated in input signal light by superposing a pseudo signal on the input signal light during the level drop;
    an optical surge compressing device for suppressing an optical surge generated in the input signal light; and
    a signal light output device for outputting the input signal light in which the level drop is compensated for by said level drop compensating device and the optical surge is suppressed by said optical surge compressing device.

2. An apparatus according to claim 1, wherein said apparatus further comprises a signal monitoring device for monitoring signal light branched from the input signal light,
    said level drop compensating device compensates for an output light level in a low-level period of the input signal light detected from monitoring signal light from said input signal monitoring device, and
    said optical surge compressing device detects an optical surge of the input signal light from monitoring signal light from said input signal monitoring device, thereby suppressing the optical surge of the input signal light.

3. An apparatus according to claim 2, wherein said level drop compensating device comprises:
    a signal light level drop detecting device for detecting a level drop of monitoring signal light from said input monitoring device;
    a compensation signal light generating device for generating output light level compensation signal light for compensating for an output light level of the input signal light; and
    a compensation signal light superposing device for superposing the output light level compensation signal light output from said compensation signal light generating device on the input signal light during the low-level period detected by said signal light level drop detecting device.

4. An apparatus according to claim 3, wherein the output light level compensation signal light generated by said compensation signal light generating device has a different wavelength from a wavelength of the input signal light.

5. An apparatus according to claim 1, wherein said signal light output device comprises an optical amplifier which has an amplification function and controls an optical output constant.

6. An apparatus according to claim 1, wherein said signal light output device comprises an optical amplifier which has an amplification function and a gain controlled constant.

7. An apparatus according to claim 1, wherein said signal light output device comprises an optical amplifier which has an amplification function and controls an optical output constant while a gain is controlled.

8. An apparatus according to claim 1, wherein said optical surge compression device comprises:
    an optical surge detecting device for detecting an optical surge of the monitoring signal light from said input signal monitoring device;
    a light intensity modulating device which transmits the input signal light and has a light transmission characteristic controlled externally; and
    a light intensity modulation control device for controlling the light transmission characteristic of said light intensity modulating device to suppress transmission of the input signal light on the basis of an optical surge detection signal from said optical surge detecting device.

9. An apparatus according to claim 8, wherein said optical surge compression device comprises:
    a light intensity modulation control device for controlling the light transmission characteristic of said light intensity modulating device to suppress transmission of the input signal light on the basis of an optical surge detection signal from said optical surge detecting device.

10. An apparatus according to claim 1, wherein said optical surge compression device comprises:
    an optical surge detecting device for detecting an optical surge of the monitoring signal light from said input signal monitoring device.

11. An apparatus according to claim 1, wherein said optical surge compression device comprises:
    a light intensity modulating device which transmits the input signal light and has a light transmission characteristic controlled externally.

12. An apparatus according to claim 11, wherein said optical surge compression device comprises:
    a light intensity modulation control device for controlling the light transmission characteristic of said light intensity modulating device to suppress transmission of the input signal light on the basis of an optical surge detection signal from said optical surge detecting device.

13. An optical surge suppressing apparatus comprising:
    a level drop compensating device for compensating for a level drop generated in input signal light;
    an optical surge compressing device for suppressing an optical surge generated in the input signal light;
    a signal light output device for outputting the input signal light in which the level drop is compensated for by said level drop compensating device and the optical surge is suppressed by said optical surge compressing device;
    a signal monitoring device for monitoring signal light branched from the input signal light,
    said level drop compensating device compensates for an output light level in a low-level period of the input signal light detected from monitoring signal light from said input signal monitoring device,
    said optical surge compressing device detects an optical surge of the input signal light from monitoring signal light from said input signal monitoring device, thereby suppressing the optical surge of the input signal light;
    wherein said level drop compensating device comprises:
        a signal light level drop detecting device for detecting a level drop of monitoring signal light from said input monitoring device;
        a compensation signal light generating device for generating output light level compensation signal light for compensating for an output light level of the input signal light;
        a compensation signal light superposing device for superposing the output light level compensation signal light output from said compensation signal light generating device on the input signal light during the low-level period detected by said signal light level drop detecting device; and an optical delay device for delaying the output light level compensation signal light output from said compensation signal light generating device, and synchronizing a timing for superposing the output light level compensation signal light on the input signal light in the low-level period detected by said signal light level drop detecting device.

14. An optical surge suppressing apparatus comprising:

a level drop compensating device for compensating for a level drop generated in input signal light;

an optical surge compressing device for suppressing an optical surge generated in the input signal light;

a signal light output device for outputting the input signal light in which the level drop is compensated for by said level drop compensating device and the optical surge is suppressed by said optical surge compressing device;

a signal monitoring device for monitoring signal light branched from the input signal light, said level drop compensating device compensates for an output light level in a low-level period of the input signal light detected from monitoring signal light from said input signal monitoring device, and said optical surge compressing device detects an optical surge of the input signal light from monitoring signal light from said input signal monitoring device, thereby suppressing the optical surge of the input signal light;

wherein said optical surge compressing device comprises:

an optical surge detecting device for detecting an optical surge of the monitoring signal light from said input signal monitoring device;

a light intensity modulating device which transmits the input signal light and has a light transmission characteristic controlled externally; and a light intensity modulation control device for controlling the light transmission characteristic of said light intensity modulating device to suppress transmission of the input signal light on the basis of an optical surge detection signal from said optical surge detecting device.

15. An apparatus according to claim 14, further comprising an optical delay device for delaying the input signal light and synchronizing a timing for controlling the transmission characteristic of said light intensity modulating device with an optical surge generation period of the input signal light.

* * * * *